(12) United States Patent
Ijiri et al.

(10) Patent No.: US 9,524,442 B2
(45) Date of Patent: Dec. 20, 2016

(54) IMAGE PROCESSING DEVICE, MANAGING SYSTEM, AND MANAGING METHOD

(71) Applicant: OMRON CORPORATION, Kyoto (JP)

(72) Inventors: Takashi Ijiri, Kyoto (JP); Takeshi Yoshiura, Kyoto (JP); Yukihiro Komatsu, Kyoto (JP); Shohei Nakaoka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 72 days.

(21) Appl. No.: 14/601,434

(22) Filed: Jan. 21, 2015

(65) Prior Publication Data

US 2015/0220799 A1 Aug. 6, 2015

(30) Foreign Application Priority Data

Jan. 31, 2014 (JP) .................. 2014-016855

(51) Int. Cl.
*G06K 9/00* (2006.01)
*G06K 9/20* (2006.01)
(Continued)

(52) U.S. Cl.
CPC ..... *G06K 9/00993* (2013.01); *G05B 19/41875* (2013.01); *G06K 9/00973* (2013.01);
(Continued)

(58) Field of Classification Search
CPC ............ G06K 9/00993; G06K 9/00973; G06K 9/2054; G05B 19/41875; G06T 1/20; G06T 7/0004
See application file for complete search history.

(56) References Cited

U.S. PATENT DOCUMENTS 7,570,797 B1 8/2009 Wang et al.
9,152,870 B2 * 10/2015 Sawhney ........... G06K 9/00979
(Continued)

FOREIGN PATENT DOCUMENTS

EP 2544088 1/2013
JP 2011-043928 3/2011

OTHER PUBLICATIONS

Extended European Search Report (EESR) issued by European Patent Office (EPO) in European Patent Application No. 15151888.3, dated Jun. 26, 2015.
(Continued)

*Primary Examiner* — David F Dunphy
(74) *Attorney, Agent, or Firm* — Greenblum & Bernstein, P.L.C.

(57) ABSTRACT

In the environment of executing an image processing for scenes by defining a parameter set for each scene, a configuration is needed capable of reflecting the change by smaller man-hour even when the content of the image processing has been changed. The image processing device includes an operating unit (that selectively executes a plurality of pieces of processing) and a storage that can be accessed from the operating unit. The storage holds: a common flow for executing processing selected out of the plurality of pieces of processing, in a predetermined order; user scene data in which a parameter set including one or a plurality of parameters are defined for each scene; and a command code concerning the parameter set included in the user scene data. The command code includes a first processing rule for causing a corresponding parameter set to reflect a result of a processing following the common flow.

15 Claims, 13 Drawing Sheets

(51) Int. Cl.
*G06T 7/00* (2006.01)
*G06T 1/20* (2006.01)
*G05B 19/418* (2006.01)

(52) U.S. Cl.
CPC .............. *G06K 9/2054* (2013.01); *G06T 1/20* (2013.01); *G06T 7/0004* (2013.01); *G06T 2207/20004* (2013.01); *G06T 2207/30108* (2013.01); *Y02P 90/22* (2015.11)

(56) References Cited

U.S. PATENT DOCUMENTS

| | | |
|---|---|---|
| 2010/0122209 A1 | 5/2010 | Mott |
| 2011/0113413 A1* | 5/2011 | Ewington ................. G06F 8/68 717/168 |
| 2013/0009973 A1 | 1/2013 | Komatsu et al. |
| 2014/0078498 A1 | 3/2014 | Ikushima |

OTHER PUBLICATIONS

U.S. Appl. No. 14/625,968 to Erina Kawabata et al., filed Feb. 19, 2015.
U.S. Appl. No. 14/625,894 to Yoshihisa Minato et al., filed Feb. 19, 2015.
U.S. Appl. No. 14/602,565 to Yoshihisa Minato et al., filed Jan. 22, 2015.

* cited by examiner

IMAGE PROCESSING DEVICE, MANAGING SYSTEM, AND MANAGING METHOD

CROSS-REFERENCE TO RELATED APPLICATION

This application is based on Japanese Patent Application No. 2014-016855 filed with the Japan Patent Office on Jan. 31, 2014, the entire contents of which are incorporated herein by reference.

FIELD

The present invention generally relates to an image processing device that can execute selected processing in a predetermined order out of a plurality of pieces of processing, and a managing system and a managing method of such an image processing device.

BACKGROUND

In the FA (Factory Automation) field and the like, there are practically used image processing devices for performing optical test and recognition to products and intermediate products. Among such image processing devices, there are also devices that can provide multifarious processing according to usages.

On other hand, in actually executing the image processing to a plurality of kinds of products by using such an image processing device, a certain level of specialized knowledge is necessary for selecting processing to be executed and for adjusting parameters necessary for each processing. Further, in the case of employing a method of setting each content of the image processing to be executed for each kind of product, tremendous man-hour becomes necessary for a maintenance work when there is certain improvement or change.

Unexamined Japanese Patent Publication No. 2011-043928 discloses an image processing device that can cope with a plurality of product types and that also makes it possible to perform maintenance by small man-hour without requiring an editing work of a plurality of flowcharts even when there arises a necessity for correcting a processing order of image processing units and parameters corresponding to the image processing units, for example.

SUMMARY

However, according to the invention described in Unexamined Japanese Patent Publication No. 2011-043928, although there are assumed addition of an image processing unit, change of execution order of image processing units, and the like, such a change mode only is insufficient for real application. For example, the change mode only cannot cope with a mode in which the execution content itself of the image processing unit is changed and handling of parameters is changed.

Therefore, in the environment of executing an image processing for each scene by defining a parameter set for each scene, there has been demanded a configuration capable of reflecting the change by smaller man-hour even when the content of the image processing has been changed.

An image processing device according to a certain aspect of the present invention includes an operating unit that can selectively execute a plurality of pieces of processing, and a storage that can be accessed from the operating unit. The storage holds: a common flow for executing processing selected out of the plurality of pieces of processing, in a predetermined order; user scene data in which a parameter set including one or a plurality of parameters are defined for each scene; and a command code concerning the parameter set included in the user scene data. The operating unit is configured to execute processing to an input image following the common flow after reading a parameter set corresponding to an assigned scene, from the user scene data. The command code includes a first processing rule for causing a corresponding parameter set to reflect a result of processing following the common flow.

According to other aspect of the present invention, there is provided a managing system including a developing device and an image processing device. The image processing device includes an operating unit that can selectively execute a plurality of pieces of processing, and a storage. The storage holds: a common flow for executing processing selected out of the plurality of pieces of processing, in a predetermined order; user scene data in which a parameter set including one or a plurality of parameters are defined for each scene; and a command code concerning the parameter set included in the user scene data. The developing device outputs a new common flow and a new command code corresponding to the new common flow in relation to each other. The image processing device further includes an updating unit that replaces a common flow and a command code held in the storage respectively with a new common flow and a new command code output by the developing device. The command code includes a first processing rule for causing a corresponding parameter set to reflect a result of a processing following the common flow.

According to a still other aspect of the present invention, there is provided a managing method using a developing device and an image processing device. The managing method includes: a step in which the image processing device holds a common flow for executing processing selected out of a plurality of pieces of processing, in a predetermined order, user scene data in which a parameter set including one or a plurality of parameters are defined for each scene, and a command code concerning the parameter set included in the user scene data; a step in which the developing device outputs a new common flow and a new command code corresponding to the new common flow in relation to each other; and a step in which the image processing device replaces a held common flow and a held command code respectively with a new common flow and a new command code output by the developing device. The command code includes a first processing rule for causing a corresponding parameter set to reflect a result of processing following the common flow.

According to the present invention, in the environment in which a parameter set is defined for each scene and an image processing is defined for each scene, even when the content of the image processing has been changed, the change can be reflected by smaller man-hour.

DETAILED DESCRIPTION

Figure 1:
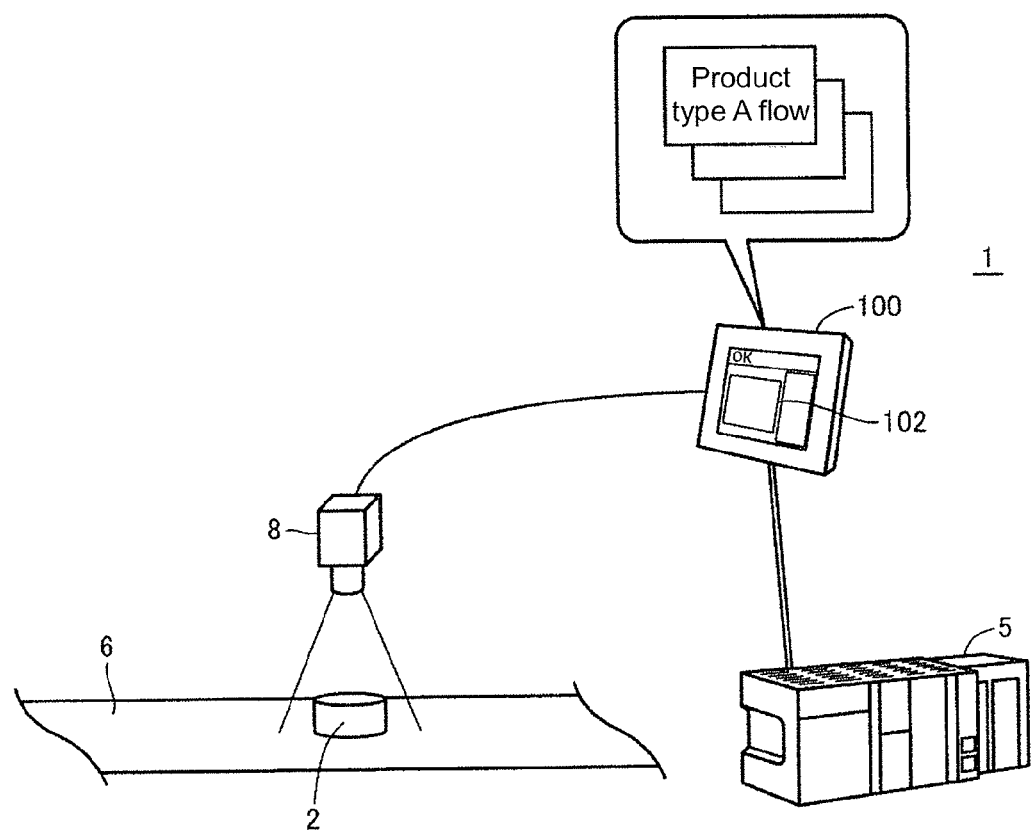
FIG. 1 is a schematic view of a configuration of a control system including an image processing device according to the embodiment.

An embodiment according to the present invention will be described in detail with reference to the drawings. In the drawings, identical or corresponding portions will be attached with the same signs, and description of these portions will not be repeated.

<A. Configuration of Control System>

First, a total configuration of a control system 1 including an image processing device 100 according to the embodiment will be described. FIG. 1 is a schematic view of the configuration of the control system 1 including the image processing device 100 according to the embodiment.

In FIG. 1, the control system 1 includes, as main components, the image processing device 100, an image capturing device 8 connected to the image processing device 100, and a PLC (Programmable Logic Controller) 5 that can communicate with the image processing device 100. FIG. 1 shows the image processing device 100 integrally configured with a display unit 102, as an example.

The image capturing device 8 is configured to include image capturing elements such as a CCD (Coupled Charged Device) and a CMOS (Complementary Metal Oxide Semiconductor) sensor, in addition to an optical system such as a lens. The image capturing device 8 outputs an image obtained by capturing the image of a work 2 (hereinafter also referred to as "input image") to the image processing device 100.

The image processing device 100 can execute the image processing including one or a plurality of pieces of processing to the input image from the image capturing device 8. An execution order is determined in advance to the one or the plurality of pieces of processing that are included in the image processing, and the content of the image processing defined by the series of processing will be also referred to as "flow".

Representatively, following the flow, the image processing device 100 executes the image processing such as a test of presence of a defect and stain on the work 2, measurement of a size and a layout direction of the work 2, and recognition of a character and a figure on the surface of the work 2. The PLC 5 executes the control of a conveying mechanism 6 and the like in cooperation with the image processing device 100.

The image processing device 100 according to the embodiment executes the image processing according to the scene of the work 2 as a processing target. More specifically, the image processing device 100 executes the image processing, following the flow and the parameters according to the scene as the processing target. The scene is representatively defined for each product type of the work 2 and a corresponding processing. That is, the image processing device 100 executes the image processing intrinsic to each scene for each scene. The detailed configurations and processing procedures will be described later.

FIG. 1 shows a configuration example that the image capturing device 8 is connected to the image processing device 100, and an input image that becomes the target of the image processing is provided from the image capturing device 8.

However, the configuration is not limited to this example. For example, the image processing device 100 and the image capturing device 8 may be integrally configured, and the image processing may be directly executed to the input image generated by the image capturing. Alternatively, the input image that becomes the target of the image processing may be given to the image processing device 100 via various kinds of memory mediums or communication mediums.

<B. Configuration of Image Processing Device>

Figure 2:
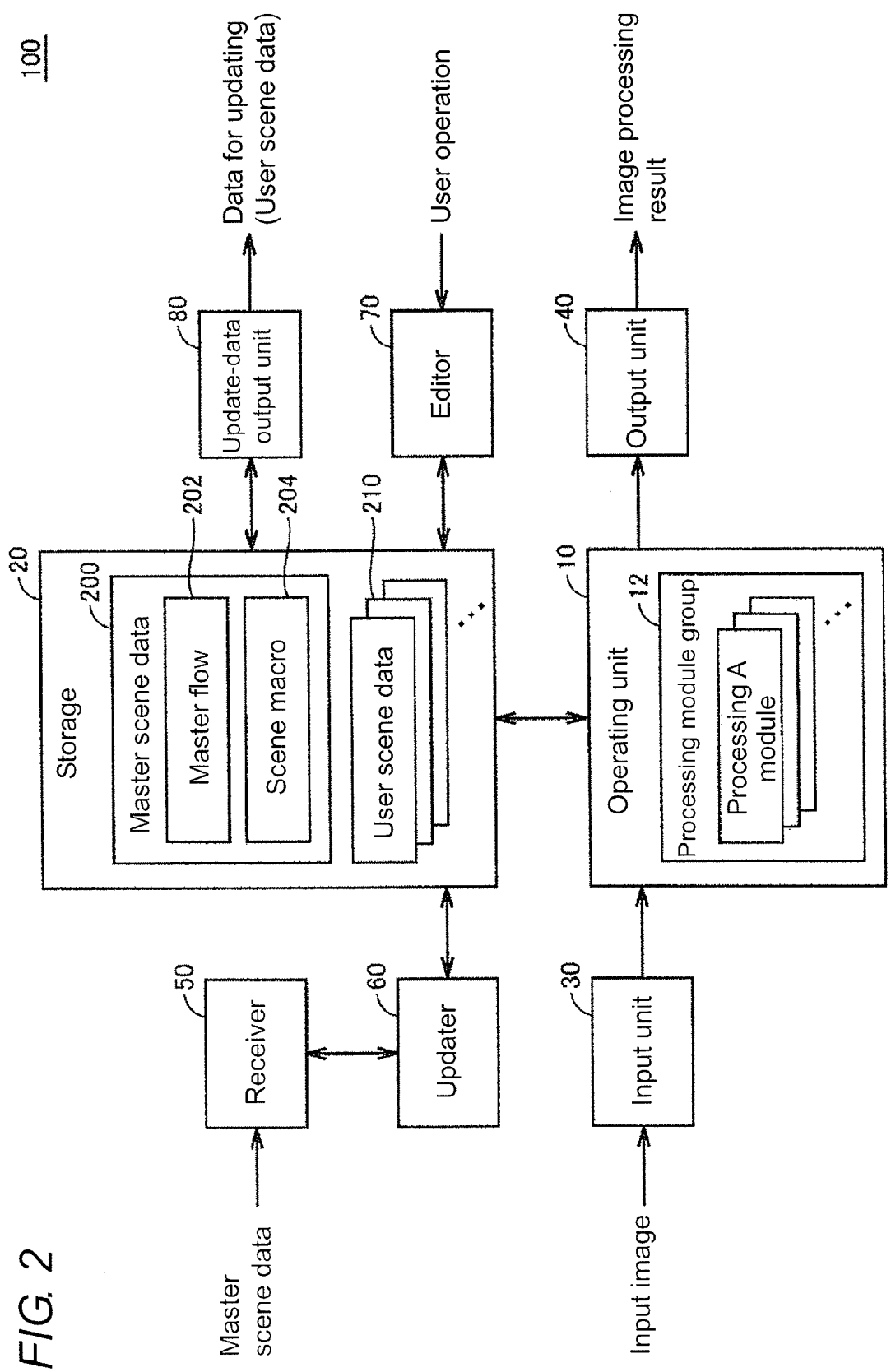
FIG. 2 is a schematic view of a configuration of the image processing device according to the embodiment.

Next, the configuration of the image processing device 100 included in the control system 1 shown in FIG. 1 will be described. FIG. 2 is a schematic view of a configuration of the image processing device 100 according to the embodiment.

In FIG. 2, the image processing device 100 includes as main components, an operating unit 10, a storage 20, an input unit 30, an output unit 40, a receiver 50, an updating unit 60, an editor 70, and an update-data output unit 80.

The operating unit 10 is configured to include a processor such as a CPU (Central Processing Unit), and a memory device. The operating unit 10 includes a processing module group 12 including a plurality of processing modules, and can selectively execute a plurality of pieces of processing.

The storage 20 holds master scene data 200 and user scene data 210. The storage 20 is configured to be accessible from the operating unit 10. The operating unit 10 reads the master scene data 200 and the user scene data 210, and executes a scene-categorized image processing.

The master scene data 200 defines a common flow that can be executed in common between scenes. The user scene data 210 defines information intrinsic to each scene, representatively, a parameter set including one or a plurality of parameters. The operating unit 10 reads a parameter set corresponding to the assigned scene, from the user scene data 210, and executes the processing to the input image following the common flow. By adapting the parameter set customized for each scene conform to a processing item defined by the common flow, the scene-categorized image processing can be achieved.

More specifically, the master scene data 200 includes a master flow 202 and a scene macro 204. The master flow 202 corresponds to a common flow for executing in a predetermined order, pieces of processing selected out of a plurality of pieces of processing (that is, each processing provided by the plurality of processing modules included in the processing module group 12). The scene macro 204 corresponds to a command code concerning the parameter set included in the user scene data 210. The command code defined by the scene macro 204 includes at least a first processing rule for making a corresponding parameter set reflect a result of the processing following the master flow 202 (common flow). Further, the command code defined by the scene macro 204 includes in some cases a second processing rule for adapting the read parameter set to the master flow 202 (common flow) so that the processing can be executed following the master flow 202. Details of the command code defined by the scene macro 204 will be described later.

The input unit 30 receives an input image that becomes a target of the image processing, and outputs the input image to the operating unit 10.

Representatively, the input unit 30 is installed as a communication interface that exchanges data with the image capturing device 8 (FIG. 1), a reading interface for reading an input image stored in a memory medium, and a communication interface that obtains the input image from an external server device and the like via a communication line.

The output unit 40 outputs a result of the image processing by the operating unit 10. Representatively, the output unit 40 is installed as a display that displays the image processing result, a communication interface that transmits the image processing result to the external server device, and a printer that prints the image processing result.

The receiver 50 receives new master scene data 200 from the outside, and outputs the master scene data 200 to the updating unit 60, as will be described later. When certain updating (representatively, including change, addition, and deletion of a processing item) has been done to the master flow 202 (common flow), the image processing device 100 according to the embodiment can collectively update the content of the image processing for each scene following the updated master flow 202 (common flow). Specifically, the receiver 50 receives the new master scene data 200 that defines the updated content, and the updating unit 60 updates the master scene data 200 held in the storage 20, based on the received new master scene data 200.

That is, the receiver 50 receives the new master scene data 200 including the new master flow 202 (common flow) and the new scene macro 204 (command code) corresponding to the new master flow 202 (common flow). The new master scene data 200 is given to the image processing device 100 via an arbitrary medium. The arbitrary medium includes a memory medium and a communication medium.

After receiving the provision of the new master scene data 200 from the receiver 50, the updating unit 60 updates the master scene data 200 held in the storage 20. In this case, the updating unit 60 does not primarily update the user scene data 210. Instead, the scene macro 204 included in the new master scene data 200 bridges between the new master flow 202 and the existing user scene data 210. Details of the processing will be described in detail later. That is, when the new master flow 202 (common flow) and the new scene macro 204 (command code) corresponding to the new master flow 202 (common flow) are provided via a predetermined medium, the updating unit 60 replaces the existing master flow 202 (common flow) and the scene macro 204 (command code) held in the storage 20 to the provided new master flow 202 (common flow) and the provided new scene macro 204 (command code), respectively. In the replacement processing, the existing user scene data 210 is basically maintained as it is.

The editor 70 executes editing to the master scene data 200 held in the storage 20, that is, the master flow 202 and the scene macro 204, according to the user operation. In this way, the editor 70 edits the master flow 202 as the common flow and the scene macro 204 as the command code that are held in the storage 20.

The update-data output unit 80 is a function that becomes necessary when using the image processing device 100 as a kind of a developing device as will be described later. After a certain editing operation is done to the master flow 202 and the scene macro 204 included in the master scene data 200, the update-data output unit 80 integrally outputs the edited master flow 202 and the scene macro 204, as data for updating. That is, the update-data output unit 80 outputs the edited master flow 202 (common flow), together with the corresponding scene macro 204 (command code).

In the case of using the update-data output unit 80 at an end user 400 side, the functions of the editor 70 and the update-data output unit 80 may be invalidated, and functions that are necessary as these developing devices may not be basically installed.

The image processing device 100 has representatively a structure following a general-purpose computer architecture. The processor executes a program installed in advance, and achieves each function as shown in FIG. 2. In this case, the processing described later can be achieved by the processor executing the control program. Such a control program may be the one that executes the processing by calling necessary modules in the predetermined order and/or timing out of program modules that are provided as a part of the OS (Operating System). The control program according to the embodiment may be provided by being built into a part of other programs. Alternatively, a part or whole of the functions provided by executing the control program may be installed as an exclusive hardware circuit.

<C. Application Scheme Example>

First, application examples concerning the preparation and updating of the image processing executed by the image processing device 100 according to the embodiment will be described.

Figure 3:
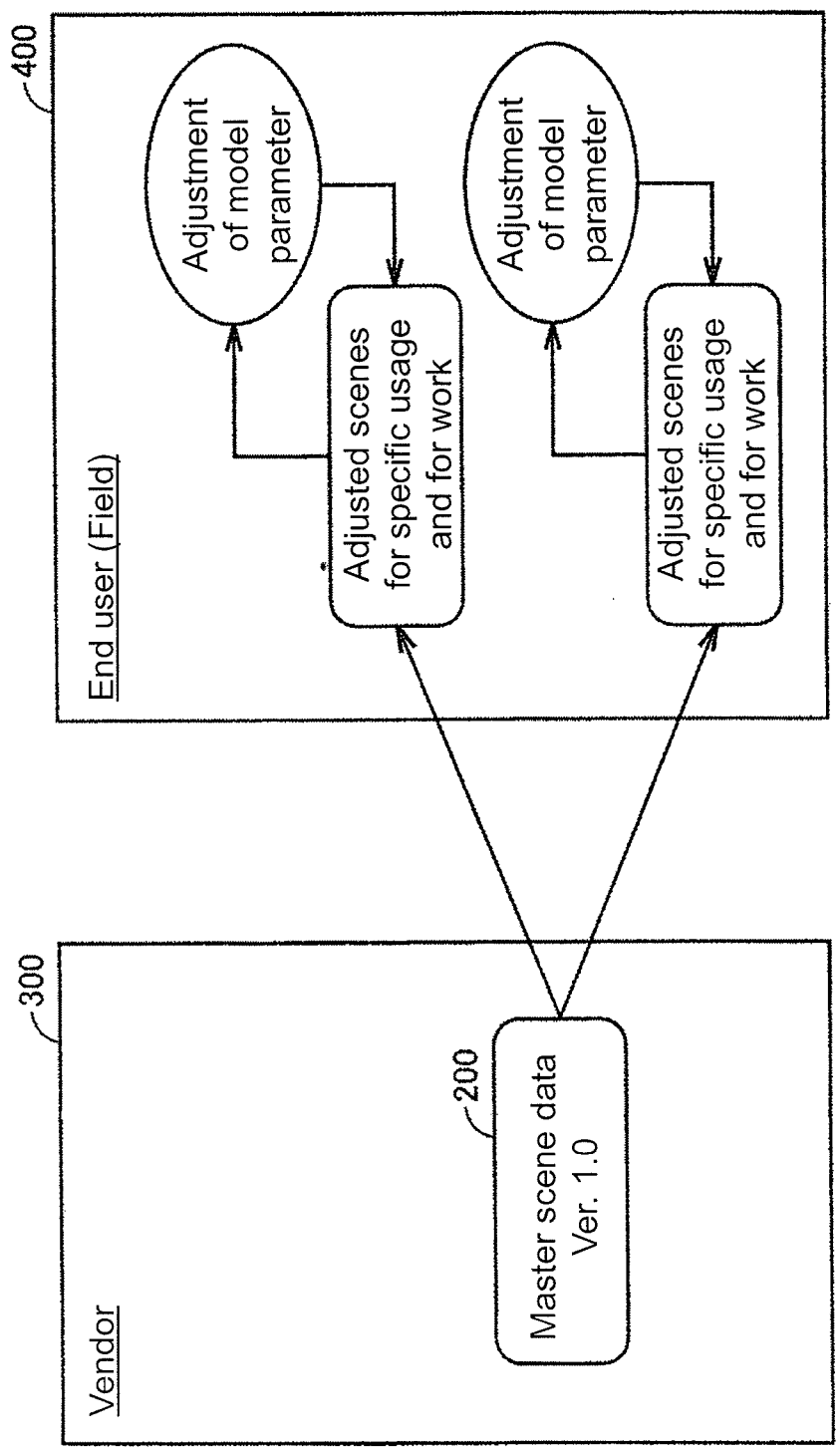
FIG. 3 is a schematic view of an application scheme example that achieves a scene-categorized image processing using master scene data according to the embodiment.

FIG. 3 is a schematic view of an application scheme example that achieves scene-categorized image processing using the master scene data 200 according to the embodiment. FIG. 3 shows a vendor 300 as a main body that constructs a system by combining products of one or a plurality of makers, and the end user 400 (the field where the image processing device 100 is actually used) using the system by introducing the system from the vendor 300. Representatively, the vendor 300 prepares the master scene data 200 (including the master flow 202 as a common flow), and presents the master scene data 200 to the end user 400. The end user 400 implements individual tuning according to the kind of the work 2 of the target, by using the master flow 202 as the common flow. More specifically, the end user 400 adjusts parameters, model images, and the like, and generates flows of individually adjusted scenes for specific usage and for the work, as shown in FIG. 4.

Figure 4:
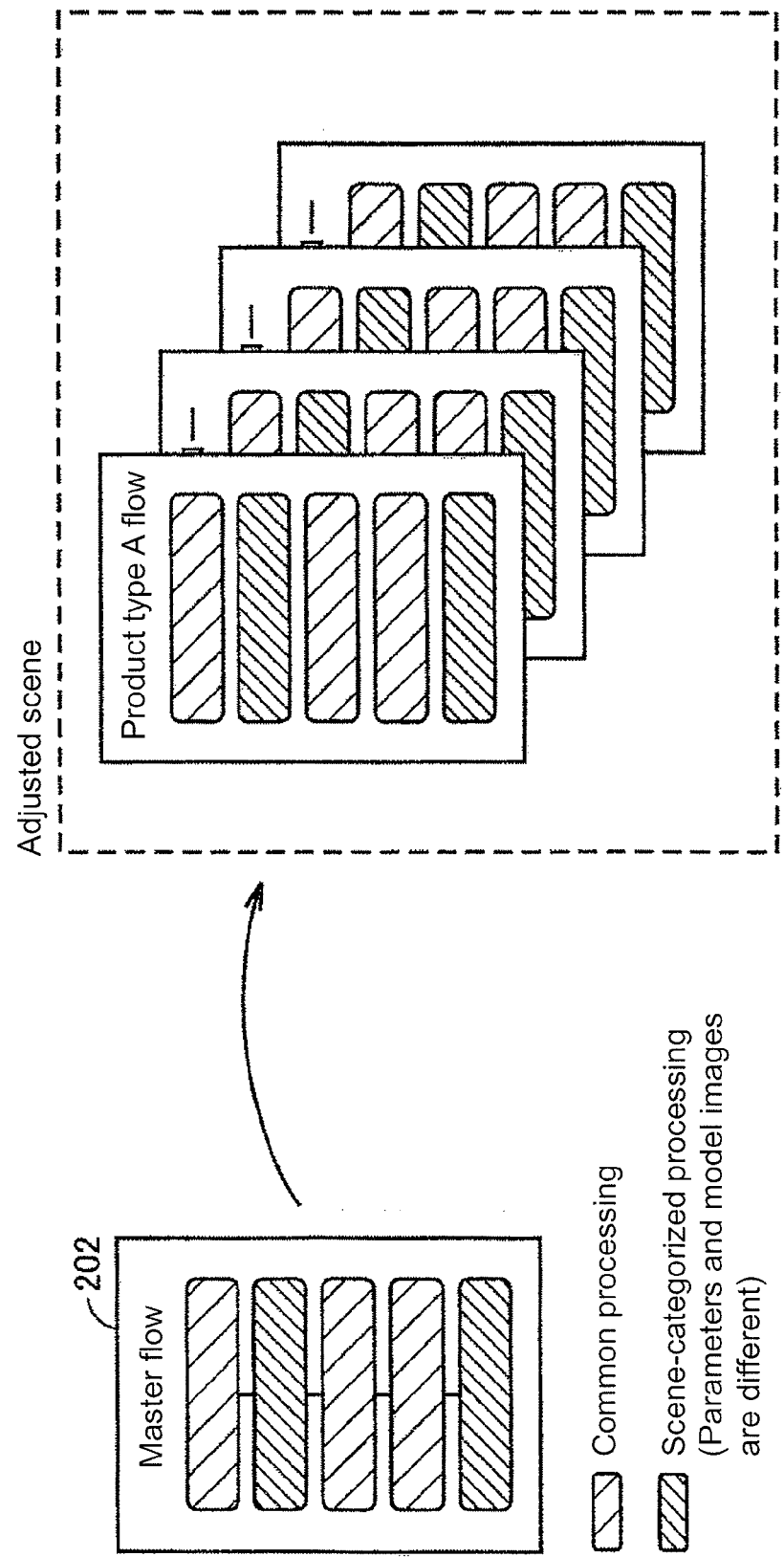
FIG. 4 is a schematic view of a processing procedure for generating individually adjusted scenes from master scene data in the application scheme example shown in FIG. 3.

FIG. 4 is a schematic view of a processing procedure for generating individually adjusted scenes from the master scene data 200 in the application scheme example shown in FIG. 3. In FIG. 4, the master flow 202 included in the master scene data 200 generally defines a plurality of pieces of processing of which the execution order is determined in advance. The plurality of pieces of processing can include an inter-scene common processing that can be executed in any scene, and a scene-categorized processing individually executed in each scene. In the scene-categorized processing, usually, parameters and model images are differentiated depending on each scene.

The adjustment of the parameters and the model images and the like shown in FIG. 3 is generally performed for the scene-categorized processing included in the master flow 202. Then, as shown in FIG. 4, flows of individually adjusted scenes for specific usage and for the work are generated.

As shown in FIG. 4, individually adjusted scenes can be prepared by the number of scenes of the target. Alternatively, the user scene data 210 can be prepared by the number of scenes of the target by keeping the master flow 202 included in the master scene data 200 as it is. In the former case, by selectively executing individually adjusted scenes of the target after executing the flow, the image processing adapted to each scene can be achieved. In the latter case, by reading the user scene data 210 of the target at each time of executing the flow and by adapting the user scene data 210 to the master flow 202, the image processing adapted to each scene can be achieved.

In the FA field, as shown in FIG. 3 and FIG. 4, there are often used the application scheme that the vendor 300 provides multi-application general-purpose master scene data 200, and the end user 400 performs individual adjustment by utilizing the master scene data 200. According to such an application scheme, by using a flow verified at the vendor side, even an end user who does not have high-level specialized knowledge can achieve a proper image processing.

Figure 5:
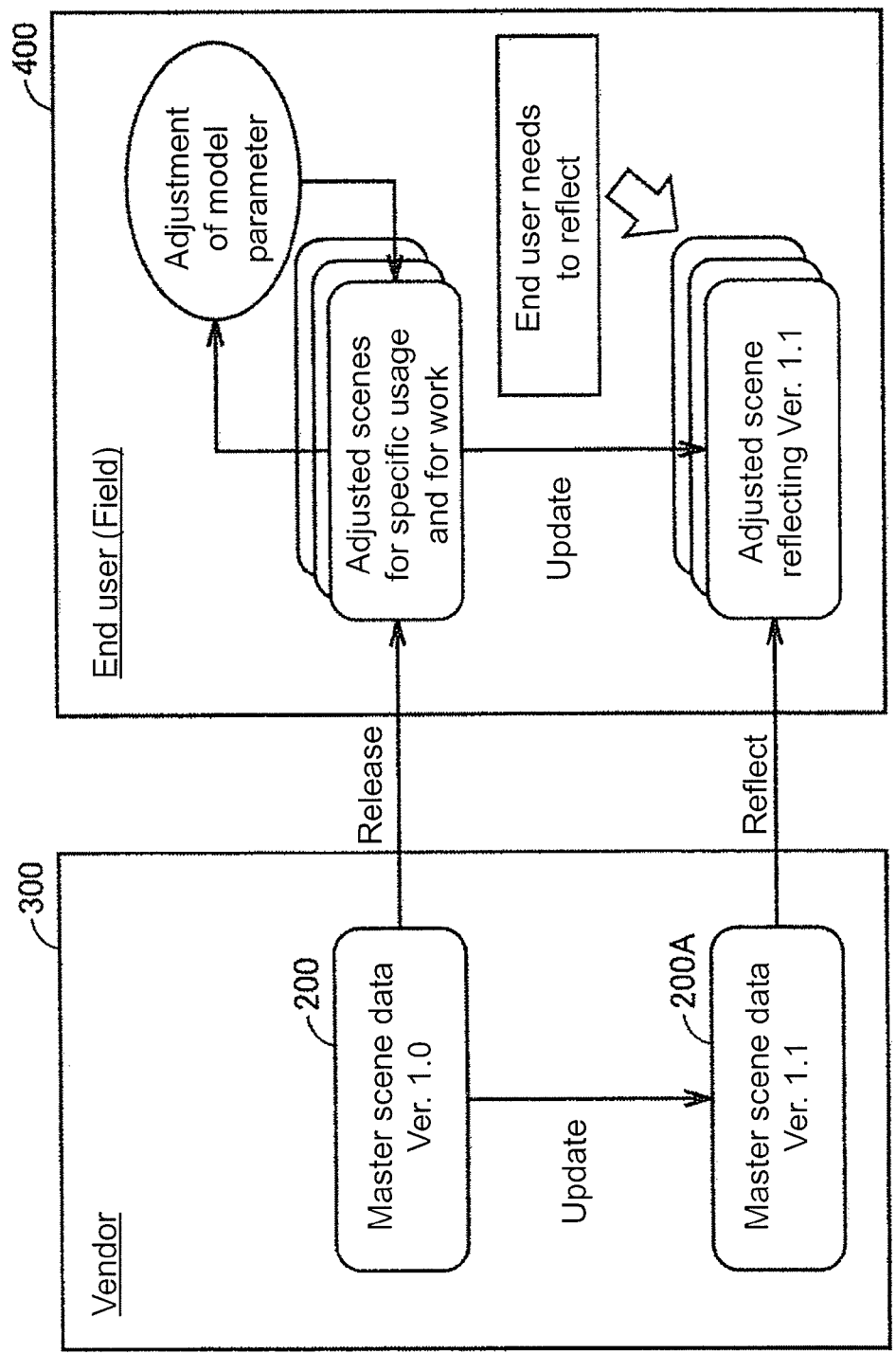
FIG. 5 is a schematic view of a processing procedure in the case of updating master scene data in the application scheme example shown in FIG. 3.

The master scene data 200 is updated in some cases according to a result of researches and developments by the vendor 300 and a demand from the end user 400. FIG. 5 shows a processing procedure in such a case. FIG. 5 is a schematic view of a processing procedure in the case of updating the master scene data 200 in the application scheme example shown in FIG. 3.

FIG. 5 exemplifies a case where after the vendor 300 released the master scene data 200 of Ver.1.0 to the end user 400, the vendor 300 side has updated the master scene data 200 from Ver.1.0 to Ver.1.1. In this case, it is necessary that the vendor 300 provides updated master scene data 200A to the end user 400, and the vendor 300 side reflects the content.

As described with reference to FIG. 3, because the end user 400 side has generated a flow of an adjusted scene for each of a plurality of scenes by using the master scene data 200A, it is necessary to reflect the content of the updated master scene data 200A to the flow of each adjusted scene. The end user 400 side needs to implement the reflection operation. At the end user 400 side, because the user scene data 210 has been generated to be adapted to pre-updated master scene data 200, the operation will not be satisfactorily performed by only simply replacing the pre-updated master scene data 200 to the updated master scene data 200A.

That is, the intended image processing cannot be achieved by the combination of the updated master scene data 200A and existing (before updating) the user scene data 210.

Therefore in the embodiment, the updated master scene data 200A is distributed by including not only an updated master flow 202A (common flow) but also a corresponding scene macro 204A in the updated master scene data 200A. The scene macro 204A defines a command code for adapting the existing user scene data 210 to the updated master flow 202A. Accordingly, the end user 400 can apply the updated master scene data 200A without performing a complex operation to the existing user scene data 210.

Further, the master flow 202A and the scene macro 204A do not need to be distributed by physically or electronically completely integrating together. The master flow 202A and the scene macro 204A may be distributed by any method so far as a correspondence relationship between the master flow 202A and the scene macro 204A is maintained in the image processing device 100 at the end user side.

<D. Summary of Updating Procedure>

Next, the summary of the master scene data 200 and the updating procedure of the master scene data 200 according to the embodiment will be described with reference to FIG. 6 to FIGS. 8(a) and 8(b).

Figure 6:
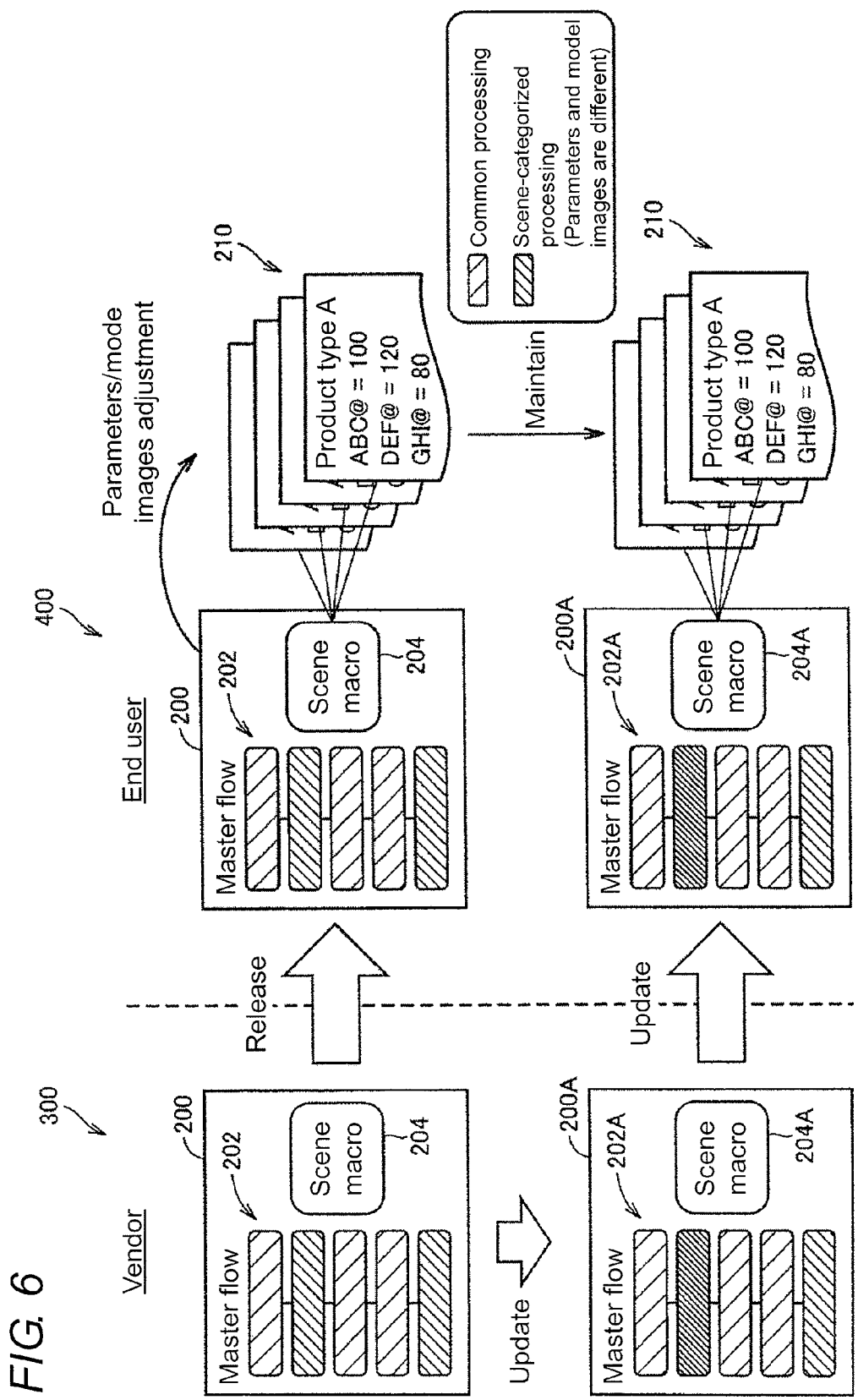
FIG. 6 is an explanatory view of an updating procedure of a master flow using master scene data according to the embodiment.
Figure 7:
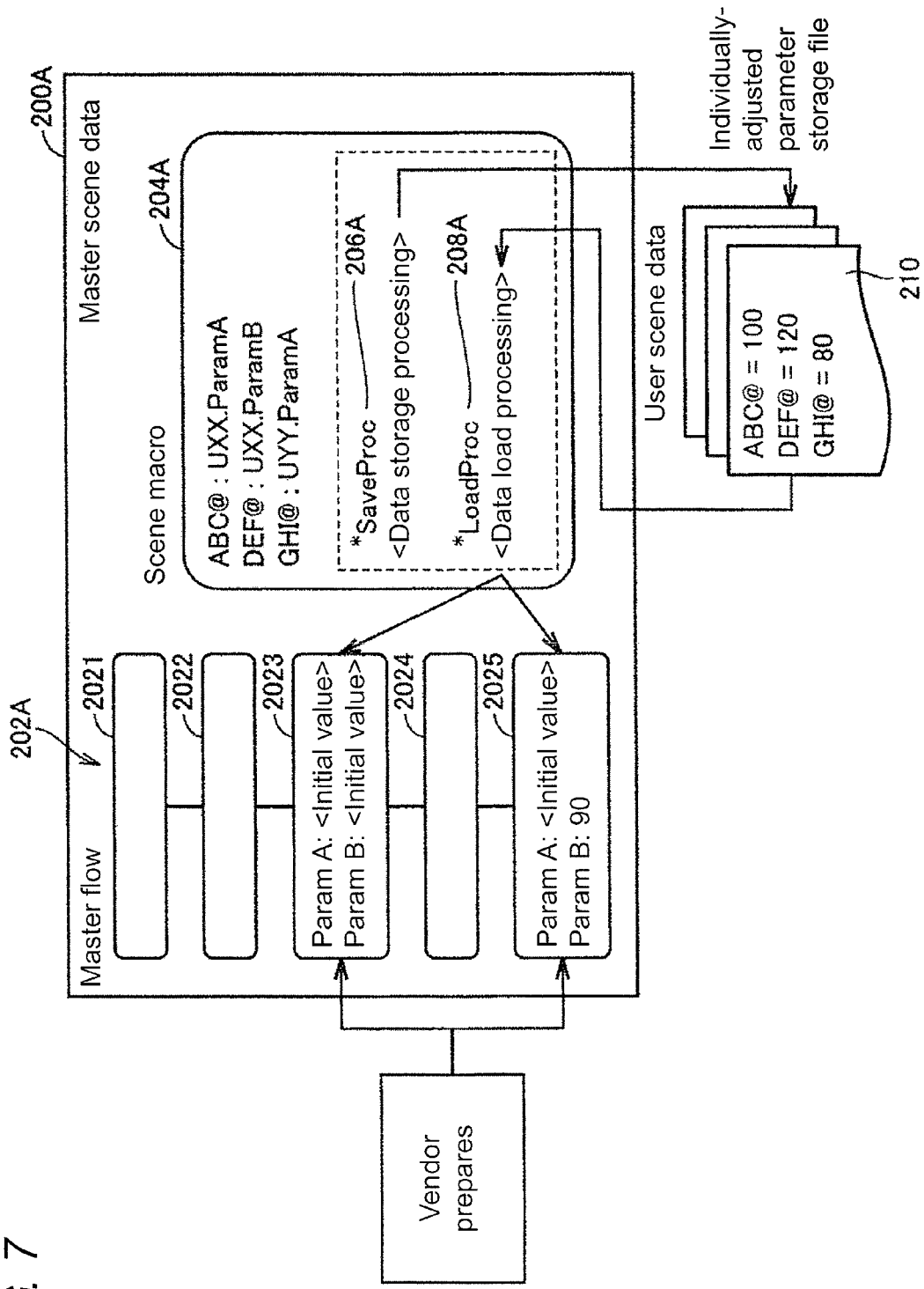
FIG. 7 is a more detailed explanatory view of the configuration of master scene data according to the embodiment.
Figure 8A:
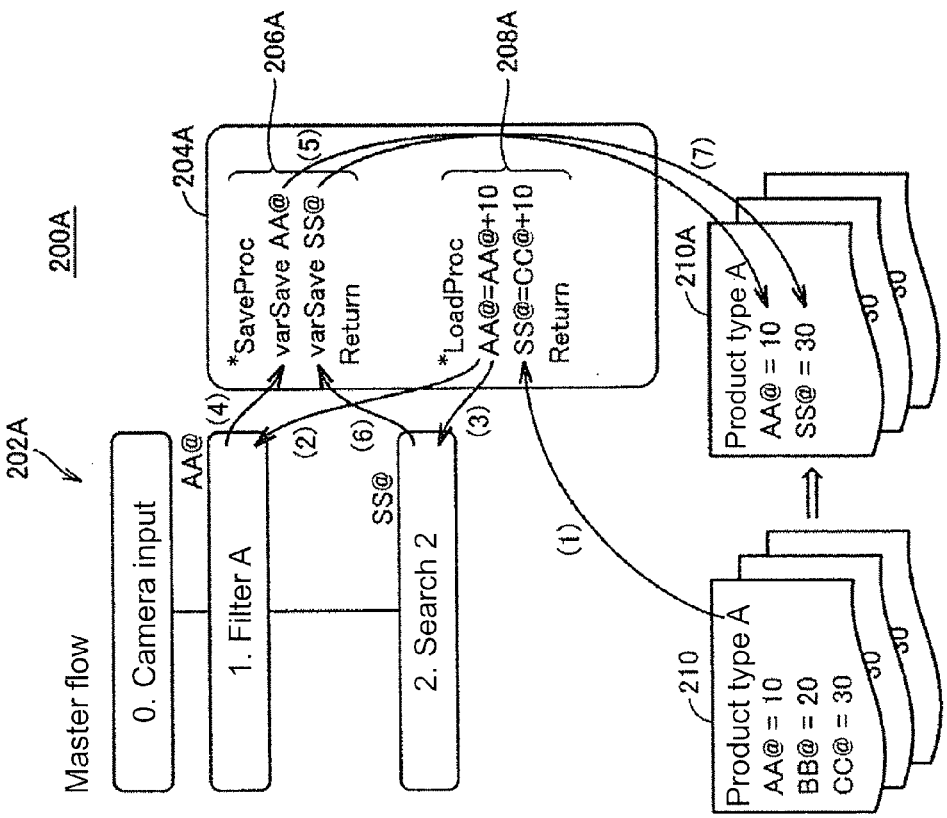
FIGS. 8(A) and 8(B) are explanatory views of an updating example of master scene data according to the embodiment.
Figure 8B:
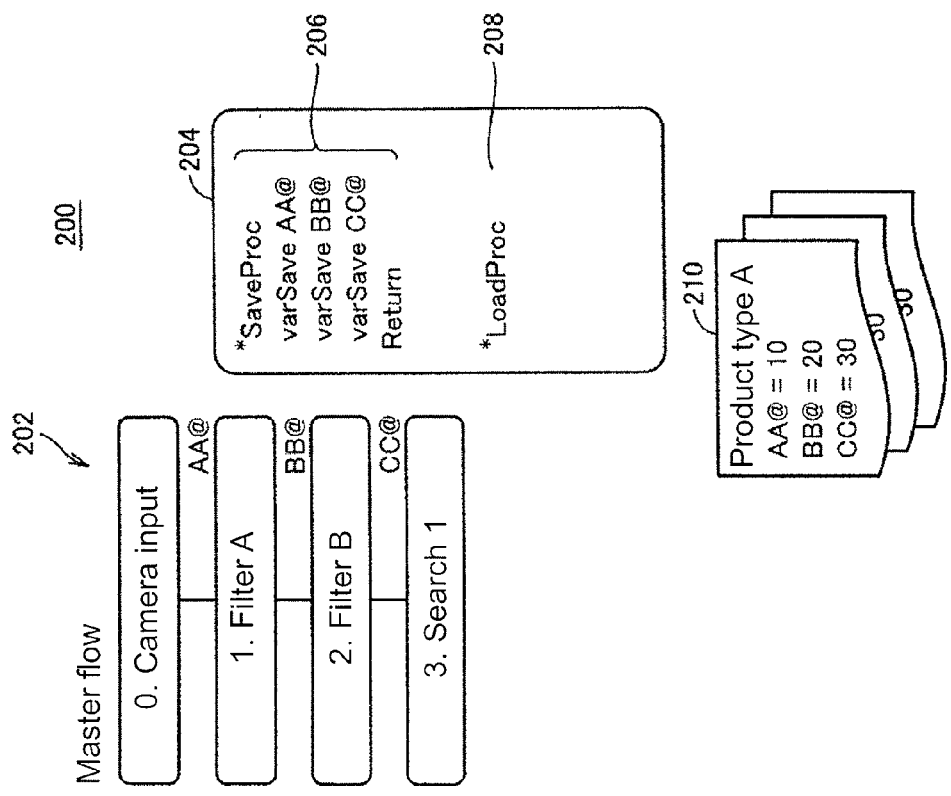

FIG. 6 is an explanatory view of the updating procedure of a master flow using the master scene data according to the embodiment. FIG. 7 is a more detailed explanatory view of the configuration of the master scene data according to the embodiment. FIGS. 8(a) and 8(b) are explanatory views of an updating example of master scene data according to the embodiment.

In FIG. 6, it is assumed that the vendor 300 first releases the master scene data 200 to the end user, and the end user side adjusts parameters and model images for each scene by utilizing the master flow 202 included in the master scene data 200. Respective flows of individually adjusted scenes are generated in this way. At this time, the user scene data 210 according to the flow of individually adjusted scenes is generated.

Thereafter, it is assumed that the vendor 300 updated the master flow 202 to the master flow 202A and thereafter, the vendor 300 prepared the master scene data 200A including the updated master flow 202A, and has provided the master scene data 200A to the end user 400. At the end user 400 side, the master scene data 200 that was held in advance is replaced by the master scene data 200A. At this time, primarily, the user scene data 210 is maintained in the existing state. However, when it is necessary to update the content of the user scene data 210, the vendor 300 defines a command code for instructing the content to be updated, in the scene macro 204A. Then, the image processing device 100 at the end user 400 side executes the scene macro 204A, so that the user scene data 210 is also updated according to the need.

FIG. 7 shows a configuration example of the updated master scene data 200A. In FIG. 7, the master scene data 200A includes the master flow 202A and the scene macro 204A. In the example shown in FIG. 7, it is assumed that the master flow 202A is configured by five pieces of processing 2021 to 2025. The processing 2021, 2022, and 2024 correspond to inter-scene common processing that are executed in any scene, and the processing 2023 and 2025 are scene-categorized processing that are individually executed in each scene. In the processing 2023 and 2025, parameters to be used are defined by variables so that parameters and model images intrinsic to scenes can be utilized. That is, variables for assigning parameters necessary to execute the processing are defined in the master flows 202 and 202A as common flows.

The user scene data 210 stores parameters of individually-adjusted parameters. In executing the image processing following the user scene data 210, the operating unit 10

(FIG. 2) obtains parameters corresponding to variables defined by each scene-categorized processing, from the user scene data 210. By using the variables in the scene-categorized processing, the flow of individually adjusted scenes that reflect the individually-adjusted parameters can be achieved.

The scene macro 204A can define a storage procedure 206A and a load procedure 208A. The storage procedure 206A corresponds to a processing rule for adapting the read user scene data 210 (parameter set) to the master flow 202A as the updated common flow so that the processing can be executed following the master flow 202A. The load procedure 208A corresponds to a processing rule for reflecting the result of the processing following the master flow 202A as an updated common flow to the corresponding user scene data 210 (corresponding to the parameter set).

The vendor prepares the updated master flow 202A by updating arbitrary processing out of inter-scene common processing and scene-categorized processing that are included in the master flow 202. At this time, in the case of updating the content of the scene-categorized processing, the vendor also defines the storage procedure 206A and/or the load procedure 208A in the scene macro 204A. Accordingly, the end user can reflect the updated master flow 202A to the existing user scene data 210, without performing any special operation.

Next, an example of the update processing from the master scene data 200 to the master scene data 200A will be described with reference to FIGS. 8(a) and 8(b).

FIG. 8(a) shows the pre-updated master scene data 200, and FIG. 8(b) shows the updated master scene data 200A. It is assumed that in the master flow 202 of the master scene data 200, a master flow including four pieces of processing has been defined. More specifically, the master flow 202 includes "camera input", "filter A", "filter B", and "search 1". Parameters that are used in "filter A", "filter B", and "search 1", respectively have been defined as variables "AA@", "BB@", and "CC@". In the storage procedure 206 of the scene macro 204, command codes for storing the respective parameters have been assigned in the user scene data 210. It is assumed that none of effective command codes are defined in the load procedure 208 of the scene macro 204. That is, the load procedure 208 is defined by the scene macro 204 according to the need. By such command codes included in the scene macro 204, parameter sets corresponding to the individually adjusted scenes are stored in the user scene data 210.

On the other hand, in the updated master scene data 200A shown in FIG.

8(b), "search 2" has been assigned in place of the third and fourth processing ("filter B" and "search 1") out of the master flow 202 shown in FIG. 8(a). The parameter used in "search 2" has been defined as a variable "SS@". In the storage procedure 206A of the scene macro 204A, command codes for storing the respective parameters in the user scene data 210 have been defined. In the load procedure 208A of the scene macro 204A, there have been defined command codes that indicate correspondence between parameter sets stored as the user scene data 210 and variables used in the updated master flow 202A. In the example shown in FIG. 8(b), it is assumed that the load procedure 208A is executed at only one time at the start for each scene stored in the user scene data 210.

When the load procedure 208A has been executed in any scene, parameters corresponding to the variable AA@ and the variable SS@ that are used in the updated master flow 202A are derived (process (1) in FIG. 8(b)), by using the variable AA@ and the variable CC@ of the corresponding scene stored in the existing user scene data 210. The derived parameters are applied to the corresponding processing of the master flow 202A, and the master flow 202A is executed as the flow of individually adjusted scenes corresponding to the scene (processes (2) and (3) in FIG. 8(b)). At the same time, based on storage of the new generated variables, the user scene data 210 is updated to the user scene data 210A. That is, the variable AA@ is stored in the user scene data 210A (processes (4) and (5) in FIG. 8(b)), and the variable SS@ is stored in the user scene data 210A (processes (6) and (7) in FIG. 8(b)).

By the above series of processing, the master flow 202 is updated to the master flow 202A, and at the same time, parameters used in the respective processing are updated.

As described above, in the scene macros 204 and 204A as command codes, there have been defined correspondence relationships between the variables defined in the master flows 202 and 202A as common flows and the parameters in the user scene data 210. The command codes that can be defined in the scene macros 204 and 204A included in the master scene data 200 and 200A are not limited, and proper contents may be defined according to the need. Execution timings may be also appropriately defined by using condition branch nodes.

The scene macro 204A may be executed triggered by switch of a set-up change, switch by the user of a screen for executing the image processing on the image processing device 100, start of the image processing in the image processing device 100, and the like.

As described with reference to FIG. 6 to FIG. 8, in the embodiment, when the vendor 300 and the like are to update the master flow 202, not only the user scene data (parameter) to be used in the processing of the updating target but also the processing to the user scene data is also defined. By defining the processing to the user scene data, updating to the master flow 202 can be performed more flexibly.

<E. Updating Example>

Hereinafter, there will be described a processing example of reflecting the updating of the master flow 202 and the update content to the flow of individually adjusted scenes. An updating example of the individually adjusted scenes generated based on the master flow 202 shown in FIG. 4 will be described below. For convenience of description, it is illustrated that a flow of individually adjusted scenes is generated for each scene. However, it is not always necessary to generate a flow for each scene, and the user scene data 210 to be applied to the master flow 202 may be generated for each scene by holding only the master flow 202.

Figure 9:
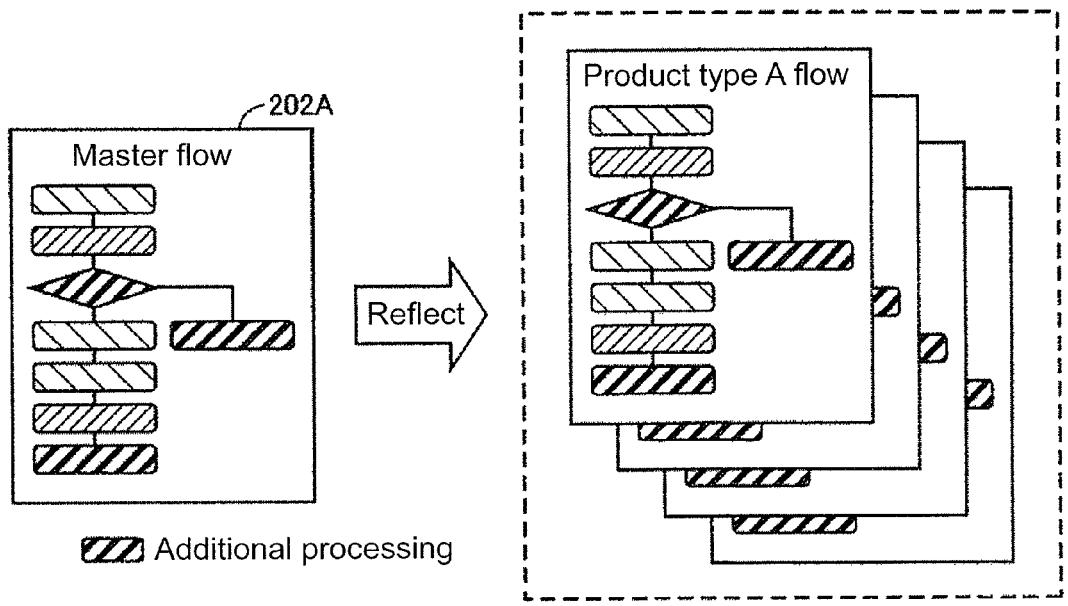
FIG. 9 shows an example of adding processing to a master flow included in master scene data according to the embodiment.
Figure 10:
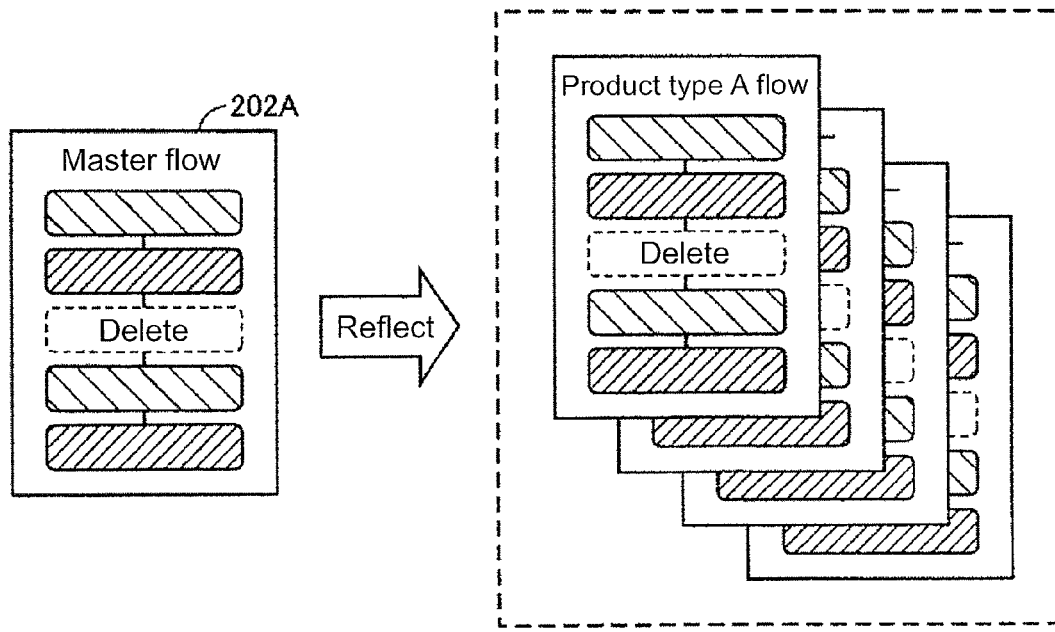
FIG. 10 shows an example of deleting processing from a master flow included in master scene data according to the embodiment.
Figure 11:
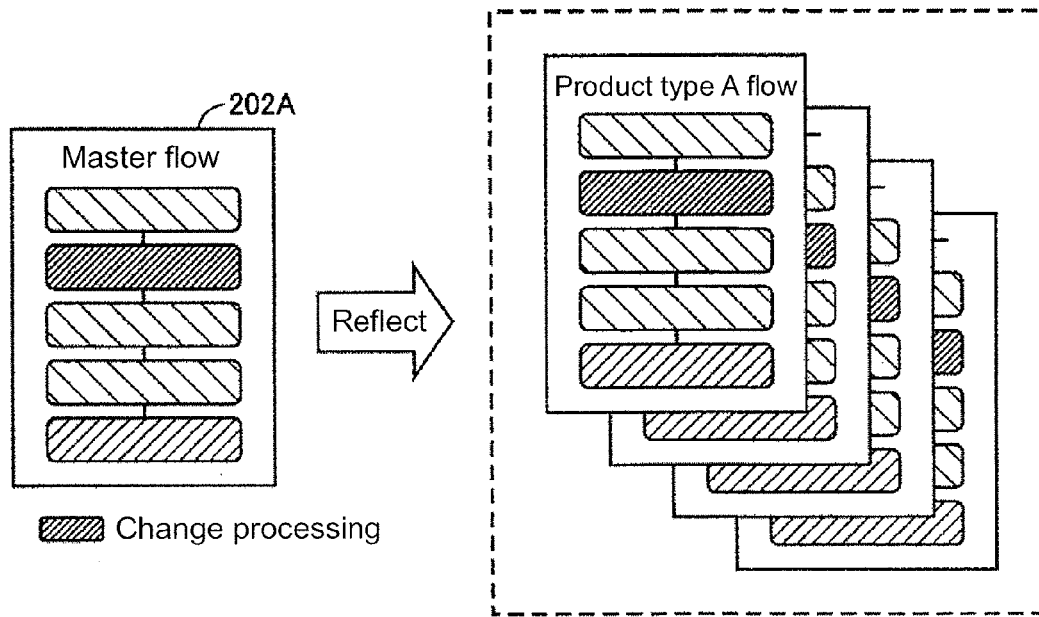
FIG. 11 shows an example of changing processing to a master flow included in master scene data according to the embodiment.
Figure 12:
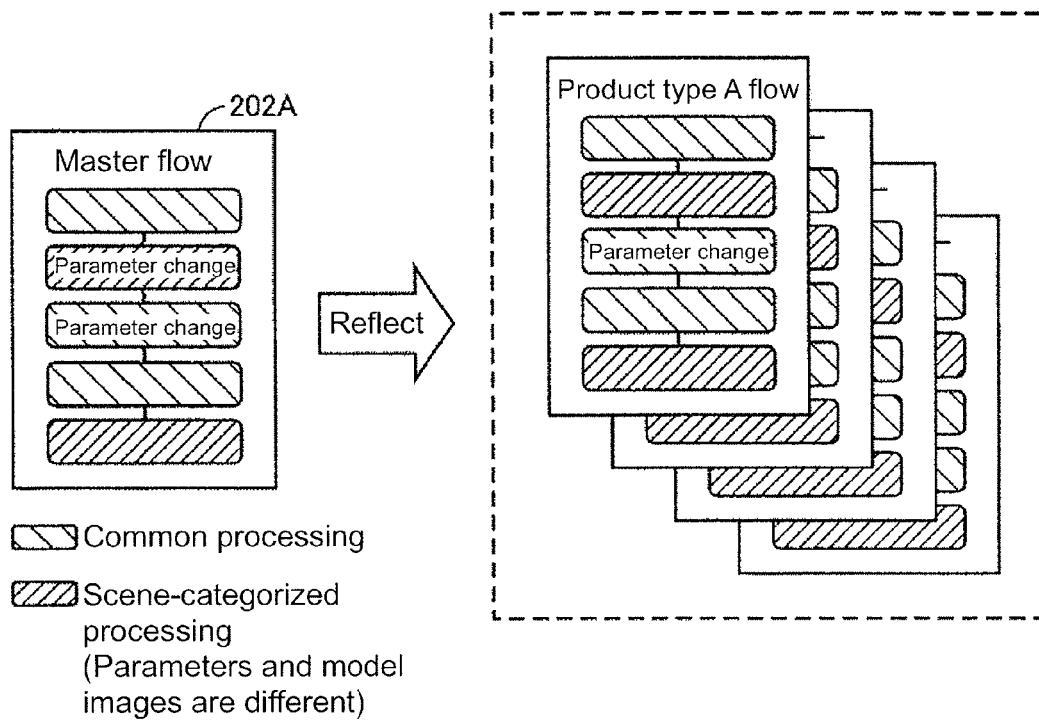
FIG. 12 shows an example of adding processing to a master flow included in master scene data according to the embodiment.

FIG. 9 shows an example of adding processing to a master flow included in the master scene data according to the embodiment. FIG. 10 shows an example of deleting processing from a master flow included in the master scene data according to the embodiment. FIG. 11 shows an example of changing processing to a master flow included in the master scene data according to the embodiment. FIG. 12 shows an example of adding processing to a master flow included in the master scene data according to the embodiment.

FIG. 9 shows an example of updating the master flow 202 to the master flow 202A by adding processing to the master flow 202. In this case, the added processing is reflected to all the flow of individually adjusted scenes.

FIG. 10 shows an example of updating the master flow 202 to the master flow 202A by deleting processing from the master flow 202. In this case, the deleted processing is reflected to all the flow of individually adjusted scenes.

FIG. 11 shows an example of updating the master flow 202 to the master flow 202A by changing processing included in the master flow 202 to separate processing. For example, there can be assumed a case where search processing following a certain algorithm has been changed to search processing following a separate algorithm. In this case, the changed processing is reflected to all the flow of individually adjusted scenes. At this time, setting values of model regions and measurement regions and model images are succeeded as they are. However, the succeeded setting values and model images may be adapted to the updated master flow 202A by using the command code defined in the scene macro.

FIG. 12 shows an example of updating the master flow 202 to the master flow 202A by changing processing included in the master flow 202 to separate processing. In the example shown in FIG. 12, it is assumed that parameters used in the inter-scene common processing and the scene-categorized processing included in the master flow 202 have been changed. In this case, only the change to the inter-scene common processing is reflected to the master flow 202A itself. Following this change, the change content is reflected to all the flow of individually adjusted scenes. On the other hand, for the change of parameters to the scene-categorized processing, command codes that describe the changes are defined in the scene macro 204A (not shown in FIG. 12).

That is, out of the pieces of processing included in the master flow 202, changes to the inter-scene common processing are reflected as it is to the master flow 202A, and contents of changes to the scene-categorized processing are reflected to the scene macro 204A.

For convenience of description, FIG. 9 to FIG. 12 show updating examples of addition, deletion and change of the processing. However, these change contents can be naturally suitably combined. Further, according to the need, updating of the content other than the above updating can be also reflected.

<F. Processing Procedure of Preparation And Updating of Master Flow>

Figure 13:
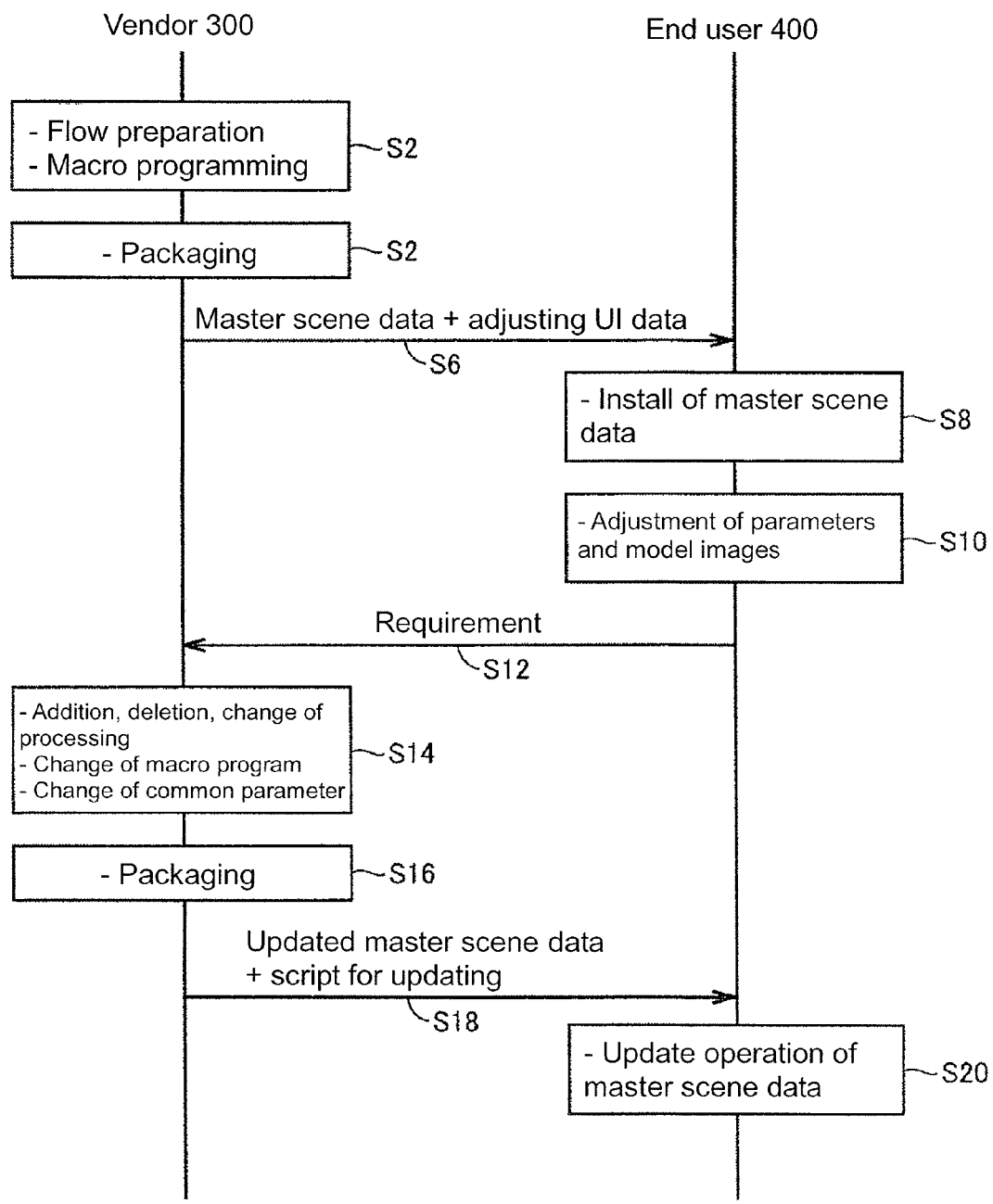
FIG. 13 is a sequence diagram of a processing procedure of preparation and updating of a master flow according to the embodiment.

Next, a processing procedure of preparation and updating of a master flow will be described. FIG. 13 is a sequence diagram of a processing procedure of preparation and updating of the master flow according to the embodiment. FIG. 13 shows an example of a series of procedure that the vendor 300 (more correctly, a technician at the vendor 300 side) prepares the master scene data 200 including the master flow 202, and thereafter updates the master flow 202. Expressing by another aspect, the image processing device 100 at the vendor 300 side functions as a developing device, and the image processing device 100 at the end user 400 side executes an actual image processing. That is, the image processing device 100 that functions as the developing device at the vendor 300 side and the image processing device 100 at the end user 400 side can achieve a type of managing system. Therefore, the processing procedure shown in FIG. 13 also has an aspect as the managing method executed by the managing system.

With reference to FIG. 13, the processing procedure will be described. The vendor 300 newly prepares the master scene data 200 including the master flow 202 (Step S2). More specifically, the vendor 300 prepares the master flow 202, and prepares the scene macro 204 by macro programming. The vendor 300 prepares the master flow 202 and the scene macro 204 in the ordinary development environment. As a detailed development environment, there is provided a processing-item setting screen that prescribes the content of each processing included in the screen of the flow preparation editing function and the flow. Next, the vendor 300 packages the master scene data 200 including the prepared master flow 202 and the scene macro 204 (Step S4). In this packaging, data (adjusting UI data) for providing a screen to adjust parameters and model images for each scene at the end user 400 side may be accompanied to the master scene data 200.

When the master scene data 200 and adjusting UI data have been provided to the image processing device 100 at the end user 400 side (Step S6), the vendor 300 or the end user 400 installs the provided master scene data 200 and the provided adjusting UI data to the image processing device 100 at the end user 400 side (Step S8). That is, in Step S8, the image processing device 100 at the end user 400 side holds the master flow 202 as a common flow for executing processing selected out of the plurality of pieces of processings, in a predetermined order, the plurality of pieces of processing, in a predetermined order, user scene data 210 in which a parameter set including one or a plurality of parameters have been defined for each scene, and the scene macro 204 as an command code concerning the parameter set included in the user scene data 210.

In the case where the vendor 300 delivers the control system 1 including the image processing device 100, there can be a mode in which the vendor 300 side installs the master scene data 200 and the adjusting UI data into the image processing device 100, and the installed image processing device 100 is provided to the end user 400 side. That is, Step S6 and Step S8 in FIG. 13 are implemented by the vendor 300 in some cases. In this case, the processing of packaging in Step S4 is not necessarily implemented.

The end user 400 adjusts parameters and model images for each target scene, and generates a flow of individually adjusted scenes by using the image processing device 100 installed with the master scene data 200 and adjusting UI data. That is, the end user 400 implements individual adjustment for specific usage and for the work (Step S10).

Figure 14:
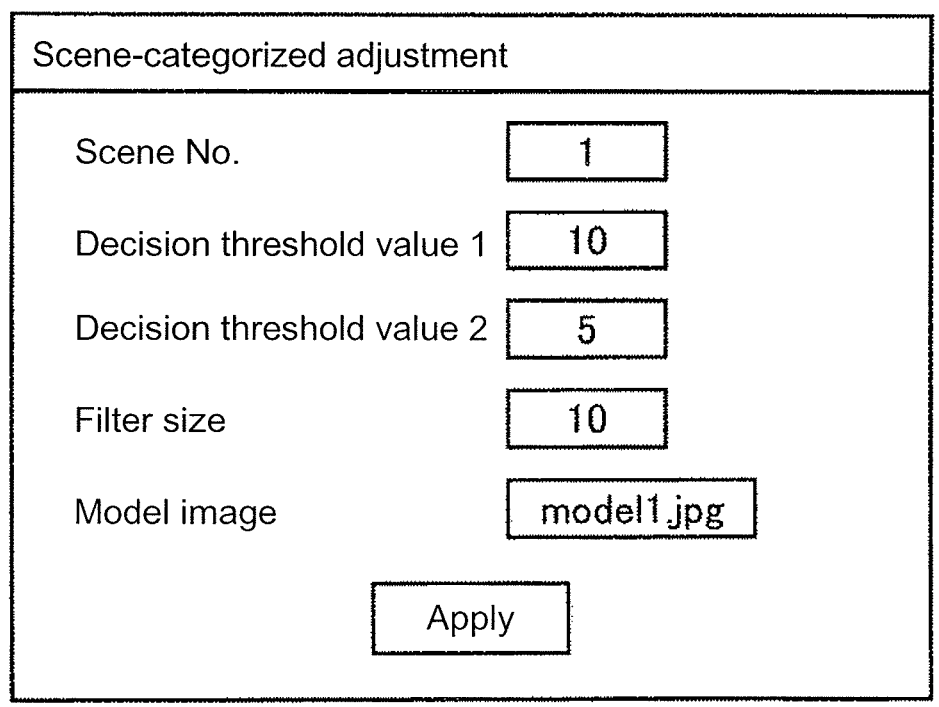
FIG. 14 is a screen example for scene-categorized adjustment provided by the image processing device according to the embodiment.

FIG. 14 is a screen example for scene-categorized adjustment provided by the image processing device 100 according to the embodiment. The screen example shown in FIG. 14 is representatively achieved by the adjusting UI data provided by the vendor 300. That is, the screen example shown in FIG. 14 is an exclusive setting screen prepared by the vendor 300. In the screen example shown in FIG. 14, only necessary items are displayed to be able to be input so that even the end user 400 who does not have high-level specialized knowledge can adjust parameters and model images for each target scene. More specifically, in the screen example shown in FIG. 14, the end user 400 can input items of (1) scene No., (2) threshold value 1, (3) decision threshold value 2, (4) filter size, and (5) model image. When the "apply" button has been pressed, the individually adjusted scenes are generated based on the input content. By using the screen example shown in FIG. 14, the end user 400 generates individually adjusted scenes by a required number, and starts actual application of the image processing.

When a certain inconvenience is found as a result of a test run, the end user 400 readjusts the input parameter or registers the model image again. The user 400 can also set a title to be able to decide the individually adjusted scenes.

Referring to FIG. 13 again, when actual application of the image processing has been started, the end user 400 side makes a certain demand to the vendor 300 side in some cases (Step S12). The vendor 300 side presents a certain proposal in some cases.

In such a case, improvement is implemented to the master flow 202. That is, the vendor 300 updates the master scene data 200 (Step S14). Specifically, the vendor 300 implements changes including updating, addition, and deletion of the prepared master flow 202 to the processing item, and also implements changes including updating, addition, and deletion of macro processing to the scene macro 204. At the same time, the vendor 300 changes parameters (common parameter) to be used in the inter-scene common processing according to the need. Alternatively, the vendor 300 sets or changes the title of the processing item included in the master flow 202 in some cases. The vendor 300 prepares the master scene data 200 in the ordinary development environment, in a similar manner to that at the preparation time of the master scene data 200. Next, the vendor 300 packages the master scene data 200A including the prepared updated master flow 202A and the prepared updated scene macro 204A (Step S16). That is, the image processing device 100 that functions as a developing device at the vendor 300 side integrally outputs the scene macro 204A as a new common flow and the scene macro 204A as a new command code corresponding to the new common flow.

In this packaging, an updating script for the end user 400 side to reflect the updated master scene data 200A may be accompanied.

When the updated master scene data 200A and the script for updating have been provided to the image processing device 100 at the end user 400 side (Step S18), the end user 400 reflects the updated master scene data 200A to the image processing device 100 at the end user 400 side by using the provided updating script (Step S20). That is, the image processing device 100 at the end user 400 side replaces the held master flow 202 (common flow) and the held scene macro 204 (command code) respectively with the updated master flow 202A (new common flow) and the updated scene macro 204A (new command code) output by the image processing device 100 at the vendor 300 side which functions as a developing device.

Figure 15A:
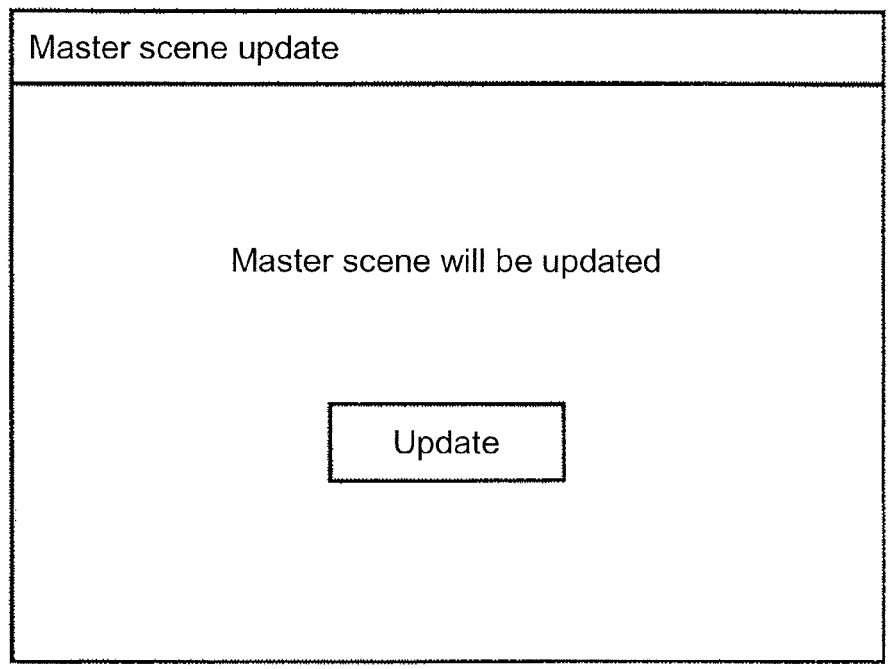
FIGS. 15(A) and 15(B) show screen examples for updating master scene data provided by the image processing device according to the embodiment.
Figure 15B:
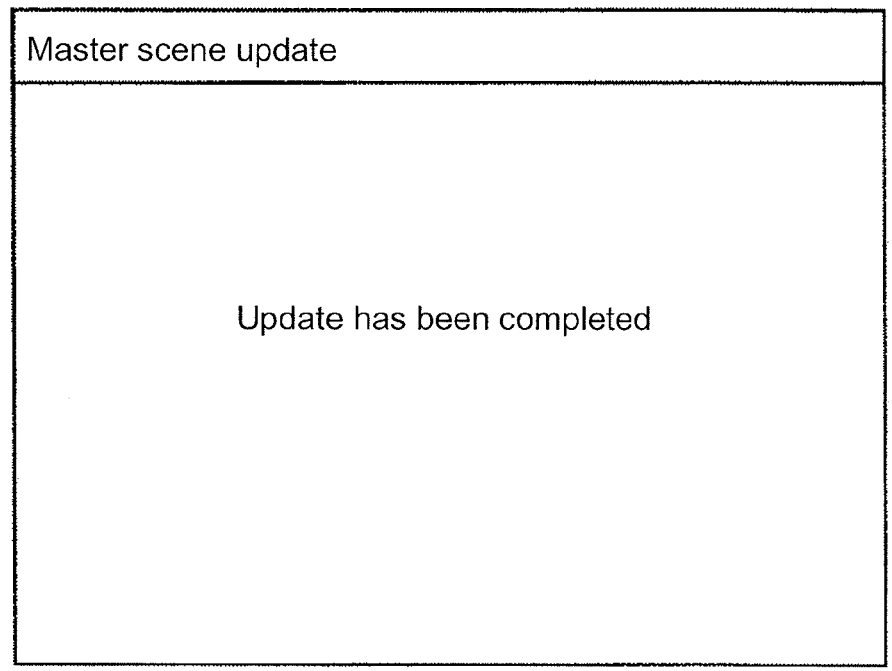

FIGS. 15(a) and 15(b) show screen examples for updating master scene data provided by the image processing device 100 according to the embodiment. The screen examples shown in FIGS. 15(a) and 15(b) are representatively achieved by an updating script provided by the vendor 300. That is, the screen examples shown in FIGS. 15(a) and 15(b) are exclusive tools prepared by the vendor 300. In the screen example shown in FIG. 15(a), there are only displayed that the updated master scene data 200A can be reflected, and a button for executing the reflection, so that the end user 400 who does not have high-level specialized knowledge can easily update to the master scene data 200A. When the end user 400 has pressed the "update" button shown in FIG. 15(a), the image processing device 100 at the end user 400 side starts the update processing to the master scene data 200A. In this update processing, basically, the master flow 202 and the scene macro 204 are replaced with the master flow 202A and the scene macro 204A, respectively. After the update processing has been completed, an update completion message is notified as shown in FIG. 15(b).

By the above series of processing, the master scene data including the master flow is updated.

<G. Image Processing Device (Development Environment) at Vendor Side>

The vendor 300 may basically prepare the master scene data 200 and update the master scene data 200A by using the image processing device similar to the image processing device 100 laid out at the end user 400 side. That is, the image processing device 100 may receive the master scene data 200 as shown in FIG. 2, and further install a function relevant to the preparation and updating of the master scene data 200, instead of only executing the flow of individually adjusted scenes. Alternatively, mainly, an exclusive development environment for executing preparation and updating of the master scene data 200 may be used. In this case, it is not always necessary to employ the operating unit 10 (refer to FIG. 2) including the processing module group 12, and it is sufficient that there are only installed a function for preparing and updating the master scene data 200 and a function for outputting the prepared or updated master scene data.

As described above, in the image processing device at the vendor 300 side, because a part or a whole are common to the image processing device 100, a detailed description will not be repeated here.

<H. Conclusion>

According to the embodiment, in the environment in which a parameter set is defined for each scene and an image processing is defined for each scene, even when the content of the image processing has been changed, the change can be reflected by smaller man-hour.

Advantages viewed from the technician at the vendor 300 side and the end user 400 respectively of the image processing device 100 and the managing system including the image processing device 100 according to the embodiment will be described below.

That is, from the viewpoint of the technician at the vendor 300 side, the technician has sufficiently understood the master scene data 200 and the content of the master flow 202 included in the master scene data 200, and the technician can update according to the need. However, it is difficult to understand what kind of the user scene data 210 is being used at the end user 400 side. Particularly, when the master flow 202 is for multi-usage and general purpose, the existing user scene data 210 prepared at the end user 400 side has enormous kinds, and it is not possible to timely verify these kinds in some cases. In such a background, it is sufficient that the image processing device 100 according to the embodiment prepares a command code for adapting each user scene data 210 to the updated master flow 202 after updating the master flow 202. Therefore, verification of the updated master flow 202 and the user scene data 210 can be substantially reduced.

From the viewpoint of the end user, because the end user does not basically understand the master scene data 200 and the processing inside the master flow 202 included in master flow 200 and the data structure, the end user cannot basically perform a complex operation. Even in such a background, according to the image processing device 100 of the embodiment, because the master flow 202 and each flow of corresponding individually-adjusted scenes can be updated basically by a very simple operation, the user can always achieve an optimum image processing without high-level specialized knowledge.

It should be considered that the embodiment disclosed this time is an exemplification in all aspects and is not limiting. The range of the present invention is expressed in claims and not in the above description, and is intended to include all alterations in the meaning and the range equivalent to the claims.

The invention claimed is:

1. An image processing device, comprising:
 a processor configured to determine a product type of an object included in an input image, and selectively execute a plurality of pieces of processing for the input image; and
 a memory configured to be accessed by the processor, wherein the memory is configured to store:

a master process flow including pieces of processing selected from the plurality of pieces of processing, to be performed in a predetermined order, the master process flow includes pieces of processing common to a plurality of product types of the object;

a plurality of user scenes corresponding to the plurality of product types of the object, each user scene including a parameter set comprising one or more parameters specific to the product type; and a command code corresponding to the parameter set, the processor is further configured to read a target parameter set corresponding to a target scene of the plurality of user scenes, the target scene being specific to the determined product type of the object, modify the master process flow with a target command code corresponding to the target scene, and to execute the modified master process flow to process the input image, and the target command code comprises a first processing rule for causing the target parameter set to reflect the modified master process flow.

2. The image processing device according to claim 1, wherein the target command code further comprises a second processing rule for adapting the target parameter set to the master process flow to provide for the modified master process flow.

3. The image processing device according to claim 2, further comprising an updater that replaces the master process flow and the command code stored in the memory with a new master process flow and a new command code, respectively, when the new master process flow and the new command code are provided via a predetermined medium, wherein the new command code corresponds to the new master process flow.

4. The image processing device according to claim 1, further comprising an updater that replaces the master process flow and the command code stored in the memory with a new master process flow and a new command code, respectively, when the new master process flow and the new command code are provided via a predetermined medium, wherein the new command code corresponds to the new master process flow.

5. The image processing device according to claim 4, further comprising a receiver that receives the new master process flow and the new command code.

6. The image processing device according to claim 5, wherein a variable for assigning a parameter used to process the input image is defined in the master process flow, and a relationship between the variable and a parameter in the user scene data is defined in the command code.

7. The image processing device according to claim 6, further comprising an editor for editing the master process flow and the command code stored in the memory.

8. The image processing device according to claim 7, further comprising an output for outputting the modified master process flow together with a corresponding command code.

9. The image processing device according to claim 1, wherein the master process flow is modified to add a new piece of processing.

10. The image processing device according to claim 1, wherein the master process flow is modified to remove a piece of processing.

11. The image processing device according to claim 1, wherein the master process flow is modified to change a parameter corresponding to the master process flow.

12. The image processing device according to claim 1, wherein the master process flow is released to an end client device.

13. The image processing device according to claim 12, wherein the master process flow at the end client device is updated by updating the master process flow at the image processing device.

14. A managing system comprising a developing device and an image processing device, wherein the image processing device comprises a processor configured to determine a product type of an object included in an input image, and selectively execute a plurality of pieces of processing for the input image, and a memory, the memory storing:

a master process flow including pieces of processing selected from the plurality of pieces of processing, to be performed in a predetermined order, the master process flow includes pieces of processing common to a plurality of product types of the object;

a plurality of user scenes corresponding to the plurality of product types of the object, each user scene including a parameter set including one or more parameters specific to the product type; and a command code corresponding the parameter set, the developing device is configured to output a new master process flow and a new command code corresponding to the new master process flow, the image processing device further comprises an updater that replaces the master process flow and the command code stored in the memory, respectively, with the new master process flow and the new command code output by the developing device, and the command code comprises a processing rule for causing a target parameter set corresponding to the determined product type of the object to modify the master process flow to reflect the target parameter set.

15. A managing method using a developing device and an image processing device, the managing method comprising:

storing, by the image processing device, a master process flow including pieces of processing selected from a plurality of pieces of processing to be performed in a predetermined order, a plurality of user scenes corresponding to the plurality of product types of the object, each user scene including a parameter set comprising one or more parameters specific to the product type, and a command code corresponding to the parameter set;

outputting, by the developing device, a new master process flow and a new command code corresponding to the new master process flow; and replacing, by the image processing device, the master process flow and the command code respectively stored in the memory, with the new common flow and the new command code output by the developing device, wherein the command code comprises a processing rule for causing a target parameter set corresponding to the determined product type of the object to modify the master process flow to reflect the target parameter set.

* * * * *

UNITED STATES PATENT AND TRADEMARK OFFICE
CERTIFICATE OF CORRECTION

PATENT NO.        : 9,524,442 B2
APPLICATION NO.   : 14/601434
DATED             : December 20, 2016
INVENTOR(S)       : T. Ijiri et al.

Page 1 of 1

It is certified that error appears in the above-identified patent and that said Letters Patent is hereby corrected as shown below:

In the Claims

Column 16, Line 27 (Claim 14, Line 18) please change "corresponding the" to -- corresponding to the --

Signed and Sealed this
Fourteenth Day of March, 2017

Michelle K. Lee
*Director of the United States Patent and Trademark Office*